United States Patent

[11] 3,628,378

[72] Inventor Edgar P. Regan, Jr.
Fairfax, Va.
[21] Appl. No. 11,530
[22] Filed Feb. 16, 1970
[45] Patented Dec. 21, 1971
[73] Assignee The United States of America as represented by the Secretary of the Navy

[54] PNEUMATIC PORTABLE DYNAMOMETER
5 Claims, 4 Drawing Figs.
[52] U.S. Cl. ............................................. 73/93,
254/93 R
[51] Int. Cl. ............................................... G01n 3/10
[50] Field of Search .................................... 73/97, 93,
94; 29/252; 81/3.2; 254/93

[56] References Cited
UNITED STATES PATENTS
2,699,060  1/1955  Safford .................. 73/94 X
3,142,980  8/1964  Anderson ............... 73/97
3,353,407  11/1967 Dietert et al. ........... 73/94 X
3,377,847  4/1968  Aske ..................... 73/97
3,404,562  10/1968 MacGlashan, Jr. et al. .. 73/97

Primary Examiner—Jerry W. Myracle
Attorneys—R. S. Sciascia, J. A. Cooke and R. J. Erickson ABSTRACT: A portable pneumatic dynamometer for developing, measuring and applying at a controlled rate both tension and compression-type loads between two movable members. A pressurized gas cartridge is utilized as the power source for which power regulation is provided by a pneumatic toggle switch and a needle valve, for controlling the rate of flow of the gas, and the movable parts consist of a housing and a piston slidable therein. Suitable attachment hardware is mounted to the housing and the piston for holding test specimens.

INVENTOR
Edgar P. Regan, Jr.

BY J.O.Tresansky
ATTORNEY

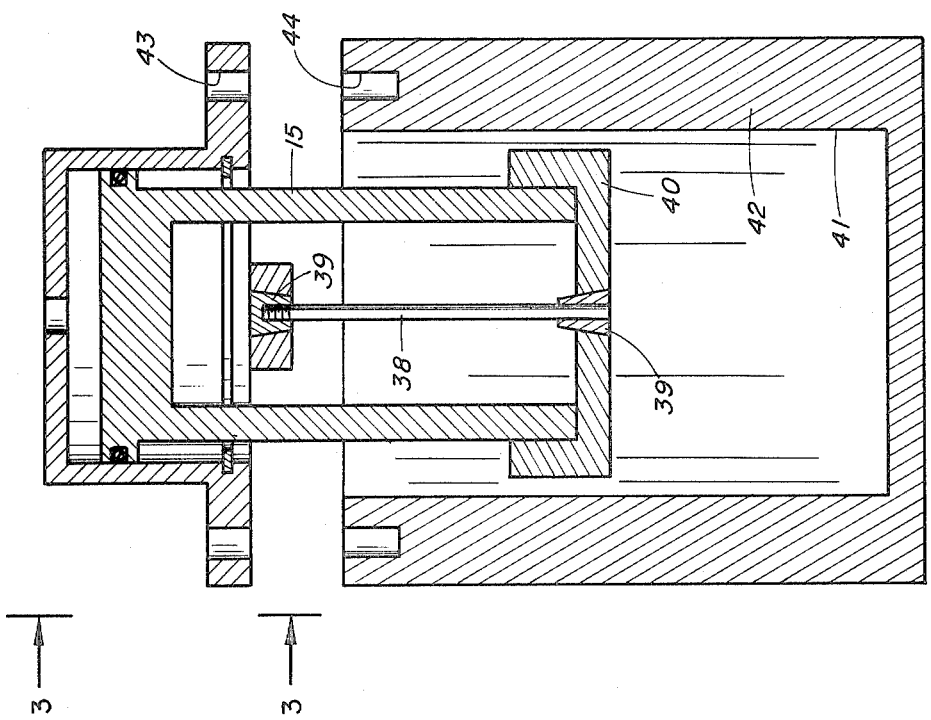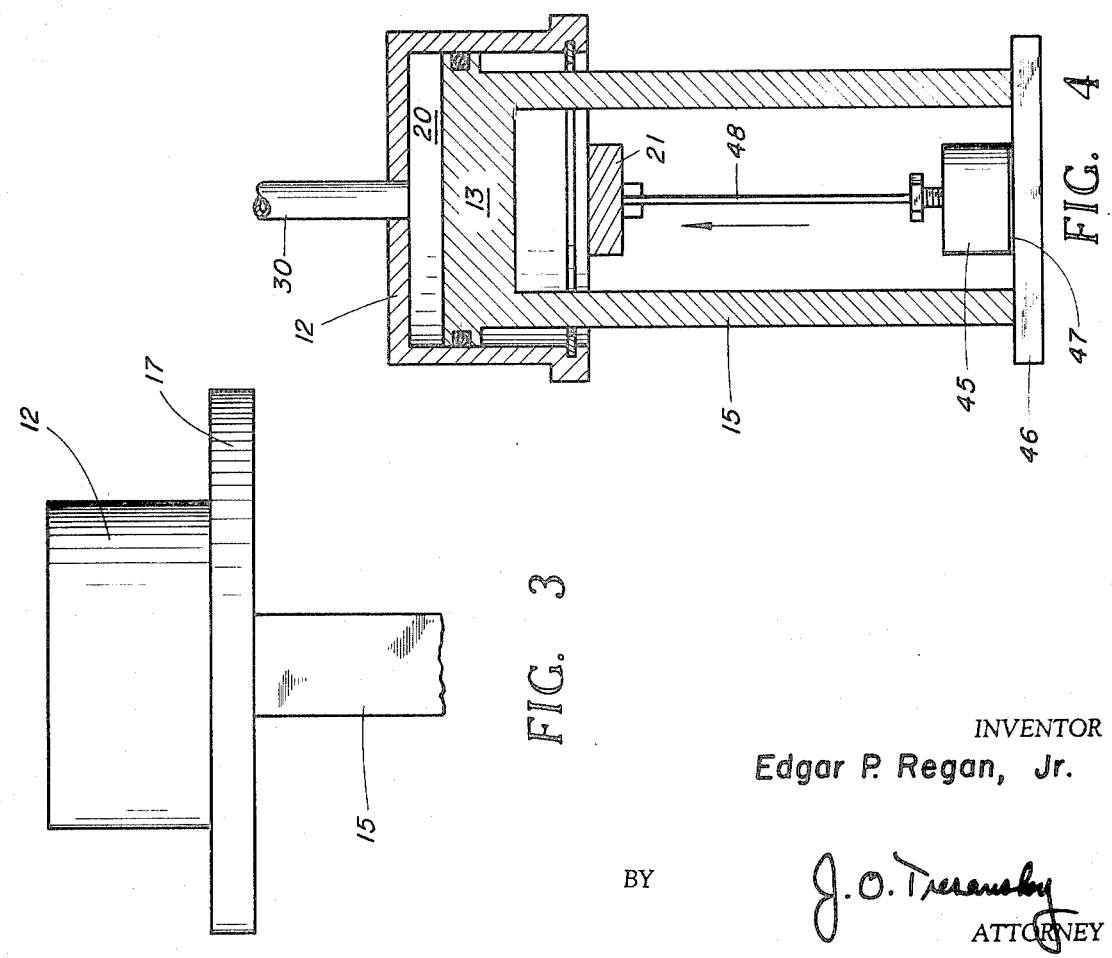

3,628,378

PNEUMATIC PORTABLE DYNAMOMETER

BACKGROUND OF THE INVENTION

This invention relates generally to materials-testing apparatus and more particularly to a portable pneumatic dynamometer for developing, measuring and applying at a controlled rate both tension and compression-type loads between two moving members.

Hydraulically powered load-producing devices, as well as other mechanical arrangements such as those which are formed with a motor-driven gear-and-screw configuration, heretofore used for scientific study and investigations of the strength of materials, especially as to their stress-strain characteristics in tension or compression, although successful for most purposes, have been found not to be entirely satisfactory for all purposes, especially since they are so bulky and heavy that they are not easily transportable.

SUMMARY OF THE INVENTION

Accordingly, it is an object of the present invention to provide a portable materials-testing machine for imposing a load on a test specimen.

It is another object of the present invention to provide a portable materials-testing machine for conducting either tension or compression tests upon a specimen.

Still another object of the present invention is to provide a portable materials-testing machine which is highly accurate, simple in construction, economical in operation and having the advantages of flexible operation and dependability of the heavier hydraulic-type machines of the type described.

The foregoing and other objects are attained by a pneumatic dynamometer for developing and applying at a control rate both tension and compression-type loads between two movable members having a pressurized gas cartridge as the power source and a needle valve controlling the rate of flow of gas into a chamber between a cylindrical housing and a slidable piston therein for causing relative movement therebetween. The test specimens are supported by suitable attachment hardware which may be secured to the housing and the piston for imposing compression or tension-loading thereon.

BRIEF DESCRIPTION OF THE DRAWINGS

Still other objects and many of the attendant features and advantages of this invention will be readily appreciated as the same becomes better understood by reference to the following detailed description when considered in connection with the accompanying drawings wherein like reference numerals designate like or corresponding parts throughout the several views and in which;

FIG. 2 is another sectional view of a jack showing the attachment hardware which may be secured to the jack for imposing tension and compression-loading on a specimen;

FIG. 3 is a sectional view taken along the line 3—3 of FIG. 2; and

FIG. 4 is a sectional view of the device illustrated in FIG. 1 in a configuration for making an adhesive test.

DESCRIPTION OF THE ILLUSTRATED EMBODIMENT

Figure 1:
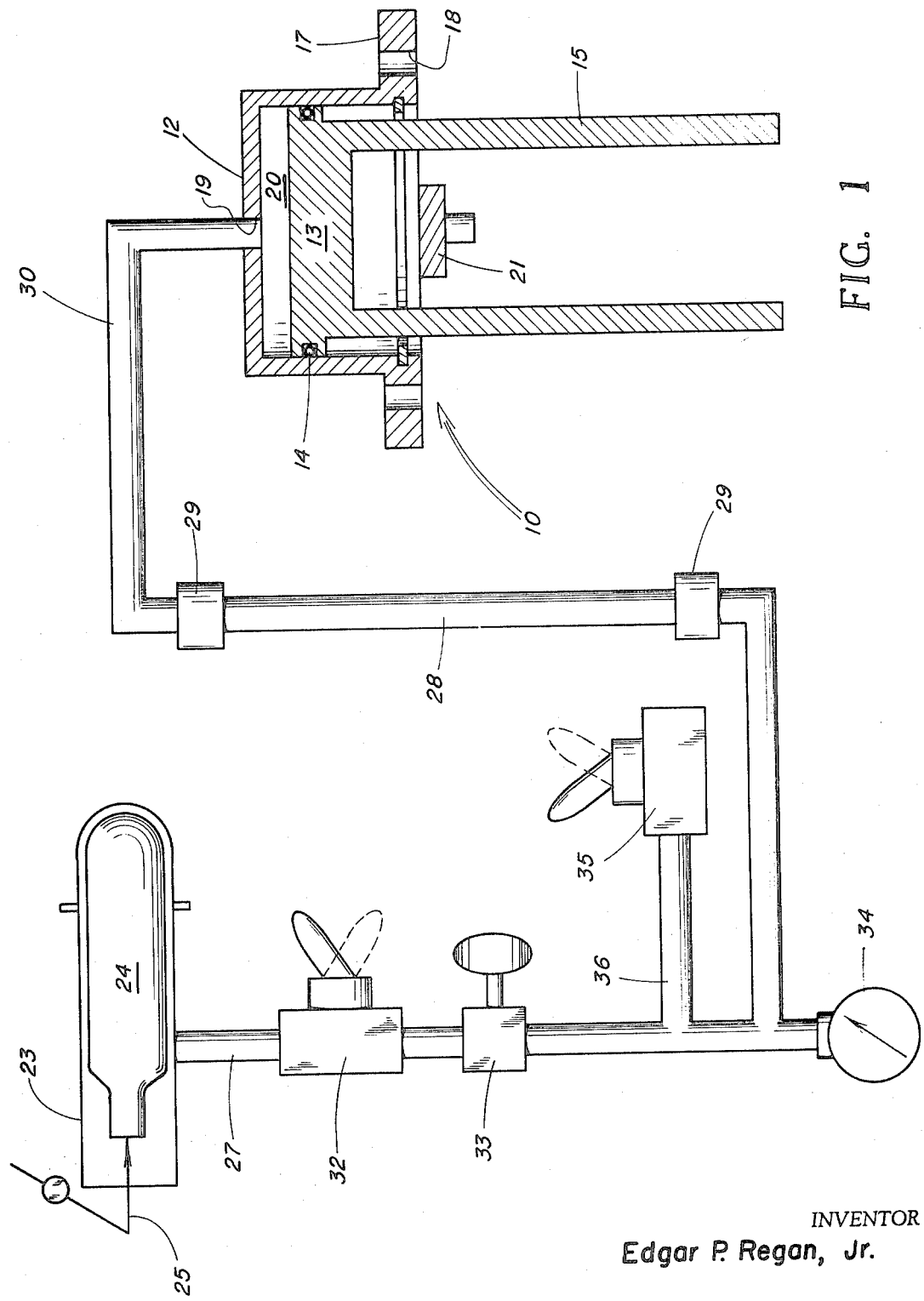
FIG. 1 is a schematic view of a portable dynamometer constructed in accordance with the teachings of the present invention and showing in section that portion thereof containing the moving elements where the loads are developed.

Referring now to the drawings, and more particularly to FIG. 1 thereof, there is shown a jack member generally indicated by the numeral 10 for developing a load on a test specimen and which comprises a cylindrical housing 12 having a piston member 13 slidably disposed therein. The piston 13 is provided with an annular groove in which there is disposed an O-ring 14 sealably engaging the inside wall of the housing 12 and has a reduced cross section at one end thereof from which there depends a pair of elongated legs 15 of arcuate cross section facing each other along a diametrical plane of a cylinder axially coincident with the piston 13. A circumferential flange 17 integrally disposed on the outside wall of the housing 12 adjacent the open end thereof is provided with a pair of diametrically opposed apertures 18 therethrough and the opposite closed end wall of the housing 12 includes an axial aperture 19 through which gas may be admitted to the chamber 20 defined between the closed end of the housing 12 and the piston member 13. Secured to the circumferential flange 17 and extending between the depending piston legs 15 across the open face of the housing 12 is an elongate bar member 21 which is adapted to receive hardware attachment devices for specimens on which tension or compression tests are to be conducted.

The power source for the jack 10 comprises a cylindrical container 23 for a pressurized gas bottle such as, for example, a $CO_2$ cartridge 24, and having a stab pin 25 sealably secured therein for releasing the gas from the cartridge into the container 23. Obviously several different gases in a variety of bottle capacities are suitable for the purpose, and the selection is dependent primarily upon the maximum load desired and the number of tests to be conducted without replacement. It is appreciated that loads reaching several thousand pounds can easily be realized. For small loads, however, such as for example, several hundred pounds, a 12-gram carbon dioxide cartridge actuated by an initiator or stabber of the type used in conventional lifejackets is satisfactory. This carbon dioxide cartridge is economical, easily replaceable, and may be used for a plurality of tests without replacement.

The pressurized gas power source is connected to the cylindrical housing 12 through a conduit network comprising a conduit 27 connected at one end to the container 23 and at its other end, through a unit of flexible hose 28 having quick-connective fluid line couplings 29 thereon, to another conduit 30 which is received through the aperture 19 in the base or closed end of the housing 12 for providing fluid communication to the chamber 20 therein. Power regulation of the pressurized gas power source for applying the gas to the piston chamber 20 of the jack 10 at a controlled rate is provided by a manually operative, on-off pneumatic toggle switch 32 in the conduit line 27 near the connection thereof to the container 23, and a needle valve 33 in the conduit line 27 between the toggle switch 32 and the flexible coupling hose 28 for controlling the flow rate of the gas and hence the rate at which the power is applied to the jack 10.

An indication of the load on the jack 10 is provided by a pneumatic pressure gage 34 which is connected into the conduit line 27 between the flow rate-controlling needle valve 33 and the flexible coupling 28. Nominal load equals the product of pressure and the piston area of the jack, but the device should be calibrated using an accurate standard. For convenience the pressure gage 34 preferably is calibrated for indicating the load in pounds rather than pressure. Repeated testing with the device has not been found to be a factor which affects the accuracy of the dynamometer. For further convenience in reading the maximum load imposed on any test, it is contemplated that the pressure gage 34 be provided with a maximum load-indicating needle.

Another pneumatic toggle switch 35 at one end of a conduit line 36 which is connected into the conduit 27 somewhere between the needle valve 33 and the jack 10 is provided for relieving the system of the gas pressure following a test.

In the operation of the dynamometer, a specimen 38 is held by any suitable grip 39 during a tension test such as shown, for example, in FIG. 2, wherein one of the grips 39 is secured to the elongated bar 21, which in turn is affixed to the housing 12, and the other grip 39 is secured to a substantially circular base member 40, which is suitably retained on the ends of the piston legs 15. For compression testing, the specimen is disposed between the plate member 40 of the piston legs 15 and the bottom or base of a bore 41 in a substantially cylindrical container 42, which is of such proportions to readily receive the depending legs 15 of the piston 13 for allowing axial movement therein when the cylindrical member 42 is attached to the circumferential flange 17 of the housing 12 in any suitable manner, such as by screws or bolts engaging in aligned apertures 43 and 44 in the housing 12 and the cylindrical member 42, respectively.

To stress the specimen, gas pressure is supplied from the pressurized cartridge 24 to the piston chamber 20 through the conduit lines 27, 28 and 30, whereupon the housing 12 and the piston member 13 are urged in relatively opposite directions for transmitting loads through the elongated bar 39 connected to the housing 12 to one end of the specimen 38, and to the other end of the specimen through the base plate 40 connected to the piston legs 15. To compress the specimen, the gas pressure in the piston chamber 20 forces the piston 13 downwardly in a direction away from the base or closed end of the housing 12 such that the circular plate 40 attached to the depending piston legs 15 is urged against one end of the specimen, movement of which is constrained by the cylindrical member 42 secured to the housing 12 and therefore immovable relative thereto.

Referring now to FIG. 4, wherein a test of adhesive characteristics of a glue or adhesive is conducted with the present invention, there is shown a test specimen 45 secured to a table or plate 46 by an adhesive 47. A flexible wire cable 48 having high strength characteristics is threadably engaged at its end with the test piece 45 and the elongated bar 21. The jack member 10 is disposed over the table 46 with the legs 15 of the piston member 13 being held thereagainst and gas pressure is admitted through the conduit line 30 to the piston chamber 20. Relative movement between the housing 12 and the piston 13 is thereby constrained by the adhesive force of the glue or adhesive 47 until such time that the pressure in the piston chamber 20 becomes sufficiently great to cause the housing 12 to be lifted in a direction away from the piston 13. Such relative movement between the housing 12 and the piston member 13, however, is effective to break the test piece 45 away from the table 46 and it is the maximum load indicated on the pressure gage 34 which is indicative of the load required to cause the adhesive 47 to yield, which therefore is a measurement of the adhesive characteristics as to strength thereof.

It will be appreciated that the present invention provides a lightweight and portable dynamometer which is economical to produce and rugged in construction and which is quite easy to operate. Obviously many modifications and variations of the present invention are possible in light of the above teachings. It is therefore to be understood that within the scope of the appended claims the invention may be practiced otherwise than as specifically described.

What is claimed is:

1. A materials-testing machine connectable to a pneumatic power source comprising:
   a substantially cylindrical housing having an axial bore formed in one end thereof;
   a piston member including a pair of diametrically opposed, elongate legs having first and second end portions and a transverse planar portion slidably disposed within said bore, fixed to said first end portion of said legs and wherein said second end portion of said opposed legs extends beyond said bore and said legs define a continuous unobstructed area therebetween;
   means for transmitting a load from said housing and said piston member to a specimen under test; and
   means for measuring the pressure developed in said housing by said pneumatic power means.

2. A materials-testing machine according to claim 1 wherein said load-transmitting means comprises:
   means adaptable to be secured to said housing for supporting said specimen under test in substantially coaxial relation with said housing and said piston and for receiving therein said depending portion of said piston, whereby upon movement of said piston away from said housing compression-loading is applied to said test specimen between said depending portion of said piston and said specimen-supporting means.

3. A materials-testing machine according to claim 1 connected to a pneumatic power means wherein said pneumatic power means comprises:
   a pressurized gas source;
   conduit means including rigid and flexible conduit members connecting said pressurized gas source and said bore of said housing on the side of said piston opposite said depending portion thereof; and
   flow rate controlling means in said conduit.

4. A materials-testing machine according to claim 3 wherein said pressure-measuring means is disposed in said conduit means between said flow rate-controlling means and said housing.

5. A materials-testing machine according to claim 1 wherein said load-transmitting means comprises:
   a substantially circular base member fixed to said second end portion of said opposed legs for attaching one end of said specimen to said piston; and
   means for attaching the other end of said specimen to said housing whereby upon movement of said housing and said piston in opposite directions tension-loading is applied to said test specimen.

* * * * *